United States Patent

Neeley

[11] Patent Number: 5,664,447
[45] Date of Patent: Sep. 9, 1997

[54] VALVE LOCKOUT

[76] Inventor: Rocky E. Neeley, 57 Parkside Rd., Rio Rancho, N. Mex. 87124

[21] Appl. No.: 317,127

[22] Filed: Oct. 3, 1994

[51] Int. Cl.$^6$ ............................................. F16K 35/10
[52] U.S. Cl. ........................... 70/175; 70/178; 70/221; 70/422
[58] Field of Search ..................... 70/175–180, 188, 70/189, 149, 472, 218, 221–223, 190, 204, 231, 422, DIG. 9; 137/384.8, 385; 251/230, 95, 101, 104; 292/DIG. 27

[56] References Cited

U.S. PATENT DOCUMENTS

| | | | |
|---|---|---|---|
| 440,714 | 11/1890 | Lamb et al. | |
| 441,357 | 11/1890 | Crowell | |
| 1,026,039 | 5/1912 | Humphrey | 251/230 |
| 1,154,389 | 9/1915 | Fogalsang | 70/178 |
| 1,248,204 | 11/1917 | Thomsen | |
| 1,250,127 | 12/1917 | Beers | |
| 1,297,038 | 3/1919 | Timmerhoff | 70/218 |
| 1,329,913 | 2/1920 | McGuire | 70/209 |
| 1,366,114 | 1/1921 | Boggs | 70/180 |
| 1,380,675 | 6/1921 | Myers | 70/178 |
| 1,511,351 | 10/1924 | Michaud | 70/221 |
| 1,516,418 | 11/1924 | Woodward et al. | 70/222 |
| 1,526,047 | 2/1925 | Butterworth | |
| 1,596,230 | 8/1926 | Benford | 70/221 |
| 1,640,763 | 8/1927 | Geyer et al. | 70/221 |
| 1,672,137 | 6/1928 | Seng | |
| 1,843,072 | 1/1932 | Stone | 70/231 |
| 2,064,769 | 12/1936 | Thompson | 70/180 |
| 2,316,956 | 4/1943 | Heath | 70/180 |
| 2,795,129 | 6/1957 | Schoepe | 70/465 |
| 2,838,270 | 6/1958 | Danielson | 251/230 |
| 3,134,291 | 5/1964 | Barry | 411/402 |
| 4,235,258 | 11/1980 | Uno et al. | 251/267 |
| 4,450,697 | 5/1984 | Ellis | 70/178 |
| 4,723,569 | 2/1988 | Ellis | 70/179 X |
| 5,085,063 | 2/1992 | Van Dyke et al. | 70/389 X |
| 5,214,982 | 6/1993 | Shieh | 70/DIG. 9 X |
| 5,415,017 | 5/1995 | Benda et al. | 70/180 X |

FOREIGN PATENT DOCUMENTS

| | | | |
|---|---|---|---|
| 655094 | 4/1929 | France | 70/231 |
| 732468 | 3/1943 | Germany | 251/230 |
| 310201 | 8/1933 | Italy | 70/179 |
| 7570 | 6/1886 | United Kingdom | 251/230 |
| 241497 | 10/1925 | United Kingdom | 70/176 |
| 2168131 | 6/1986 | United Kingdom | 137/285 |

*Primary Examiner*—Lloyd A. Gall
*Attorney, Agent, or Firm*—Paul Adams; Deborah A. Peacock; Jeffrey D. Myers

[57] ABSTRACT

A lockout device to prevent tampering with the manually set position of a valve or regulator or other device having a rotatable shaft for adjusting, for example, the flow of fluid through the device, from a position initially set to some other position. The lockout device is usable with a wide range of standard valves and regulators which have a drive stem and includes a drive gear that engages the drive stem and a key locking device mounted in a generally cylindrical handle of the lockout device and being selectively movable from a first position in which the handle free-wheels relative to the drive stem of the valve so as to prevent unauthorized moving of the rotational position of the valve stem by any person not having a key to an engaging position in which the handle is locked to the drive stem to permit ordinary rotational movement and setting of the valve stem position.

10 Claims, 6 Drawing Sheets

VALVE LOCKOUT

BACKGROUND OF THE INVENTION

1. Field of the Invention (Technical Field)

The present invention relates to devices for preventing tampering with valves and regulators.

2. Background Art

Present valve lockout products are designed to enclose or tie the existing Original-Equipment-Manufacturer (OEM) provided handle and to lock the entire device with a padlock. These products are bulky and usually are made from plastic by injection or blow molding. The present invention replaces existing handles on valves and regulators without presenting additional bulky material to the user.

Locks such as those provided by U.S. Pat. No. 440,714, to Lamb, et al., U.S. Pat. No. 441,357, to Crowell, U.S. Pat. No. 1,248,204, to Thomsen, U.S. Pat. No. 1,250,127, to Beers, U.S. Pat. No. 1,526,047, to Butterworth, U.S. Pat. No. 1,672,137, to Seng, and U.S. Pat. No. 2,795,129, to Schoepe, are each quite distinct from the present invention. Most significantly, the above inventions do not provide locking and unlocking of the mechanism via a drive gear.

SUMMARY OF THE INVENTION
(DISCLOSURE OF THE INVENTION)

The present invention is of a valve lockout device comprising: a handle body; a drive gear within the handle body for engaging a drive stem; and a locking mechanism directly engaging and preventing movement of the drive gear when the locking mechanism is in a locked position. In the preferred embodiment, the device additionally comprises a bearing surrounding the drive gear, a retaining ring to retain the bearing within the handle body, and a retaining ring to retain the drive gear within the handle body. Furthermore, the device preferably comprises a lock nut (with a spanner wrench hole pattern on the top thereof) for securing the handle to the drive stem, an assembly tool having a spanner wrench hole pattern matching that of the lock nut, and a retaining pin securing the lock nut to the handle body. A handle cap covering a top of the handle body to permit detection of tampering is also preferably employed, or a cap and padlock means covering said handle body.

The present invention is also of a valve lockout device comprising: a handle body; a drive gear means within said handle body for engaging a drive stem; and locking means directly engaging said drive gear means and preventing movement of said drive gear means in one direction when said locking means is in a locked position. The features of the first embodiment are desirable in the second. Additionally, the lock means preferably comprises a ratchet mechanism that when engaged prevents opening of a valve but permits closing of the valve.

A primary object of the present invention is to permit replacement of an OEM valve handle with a valve including lockout capabilities.

A primary advantage of the present invention is that it is more effective and not as bulky as existing padlock-based lockout systems.

Another advantage of the present invention is that it permits prevention of valve adjustment in one direction, while permitting adjustment in the other direction.

An additional advantage of the present invention is that it provides for Occupational Safety and Health Administration (OSHA) lock-out tag-out compatible protection of valves.

Yet another advantage of the present invention is that it provides for process control capabilities.

Still another advantage of the present invention is that liability may be controlled by selective use of the invention on key valves, or on all valves.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the inventions. The drawings are only for the purpose of illustrating these preferred embodiments of the invention and are not to be construed as limiting the invention. In the drawings.

DESCRIPTION OF THE PREFERRED EMBODIMENTS (BEST MODES FOR CARRYING OUT THE INVENTION).

The present invention provides lockout capabilities for valves and regulators. The invention is primarily designed to prevent all accidental or inadvertent adjustments and most intentional tampering with the position (open or closed) of the valve.

Figure 1:
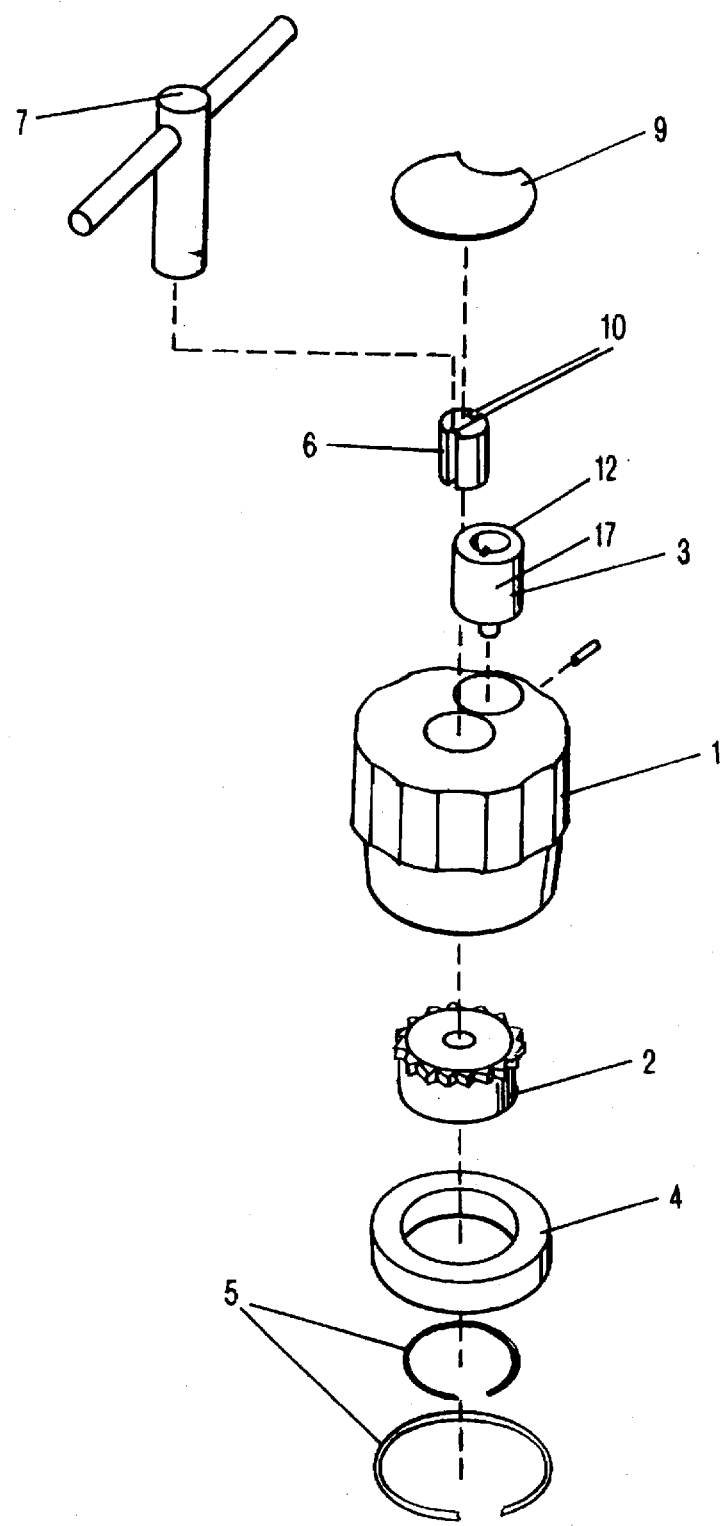
FIG. 1 is an exploded view of a first embodiment of the invention.
Figure 2:
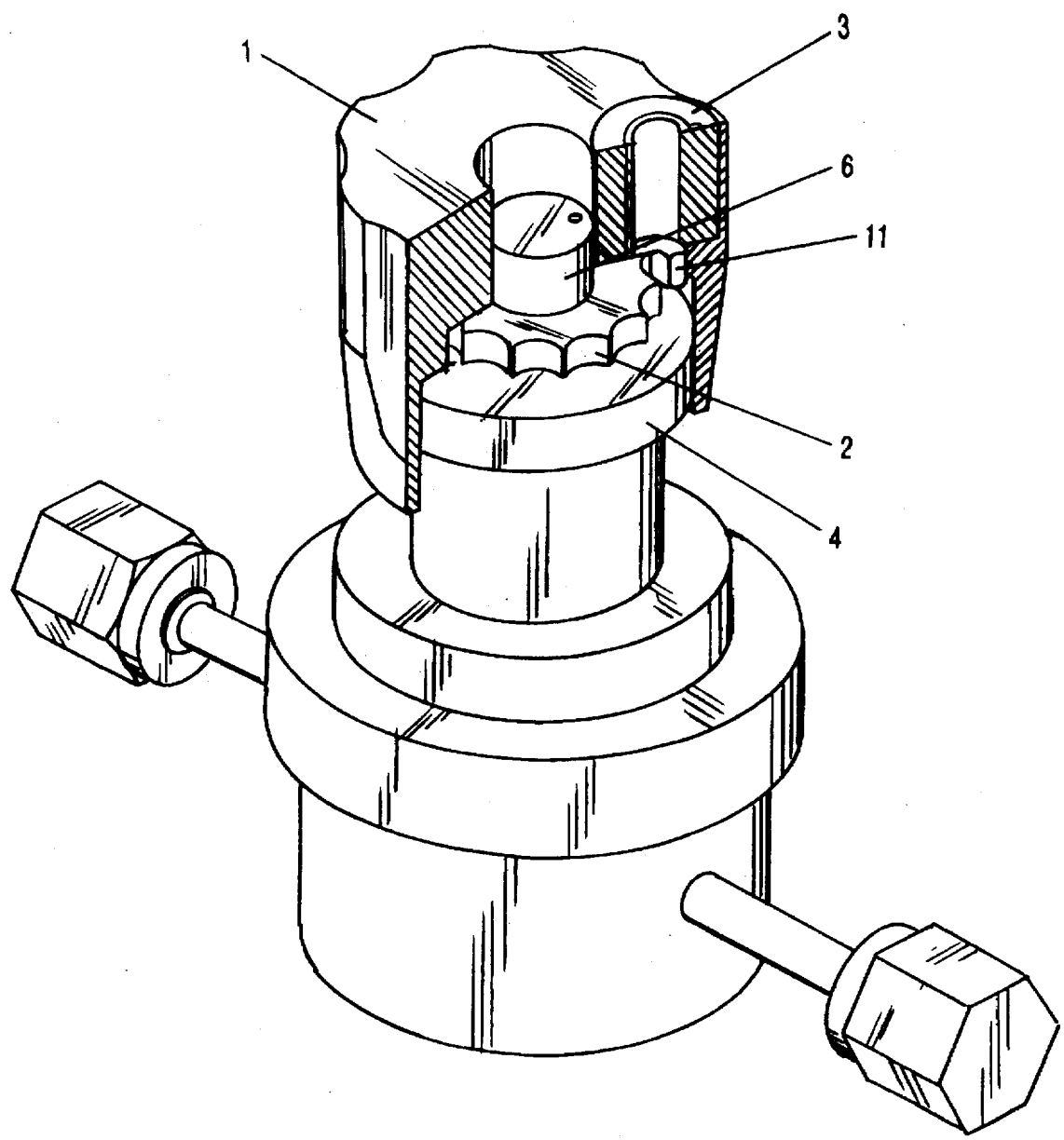
FIG. 2 is a cut-away perspective view of the embodiment of FIG. 1 when in place on a valve.

The first embodiment of the invention locks a valve in both directions. Referring to FIGS. 1 and 2, the invention comprises a main handle body 1, to which the other components of the invention attach. Handle body 1 can be constructed from machined or cast metal such as aluminum or injection-molded plastic. Handle body 1 contains drive gear component 2, which is also made of metal or plastic, and is rotatably supported by a bearing 4, both of which are held in the body by retaining rings 5. Bearing 4 allows the handle body 1 to free-wheel when in locked condition, as described below. Drive gear 2 is manufactured to fit on various OEM valves having different drive stems by changing its internal mechanical features to fit the drive stems. Also within the handle body 1 is a tumbler lock mechanism 3, which is provided off-the-shelf with various key types and includes a drive dog 11. Lock 3, is secured in an off-center opening in the handle body 1 by lock mechanism retaining pin 8. The keys pull out at zero and 180 degrees, coinciding with the off-center position of locking dog 11 which engages and disengages the drive gear. Secured to handle body 1 is the tamper proof lock or jam nut 6 which is used to secure the handle body 1 to the valve drive stem. Jam nut 6 includes a spanner wrench hole pattern 10 that only matches that of installation tool 7. This pattern can vary by customer as the installation tool 7 can also be used as an adjustment tool in an emergency. A plastic handle cap 9 may be employed to cover the jam nut 6, so that evidence of tampering is provided if the cap is removed.

Figure 3:
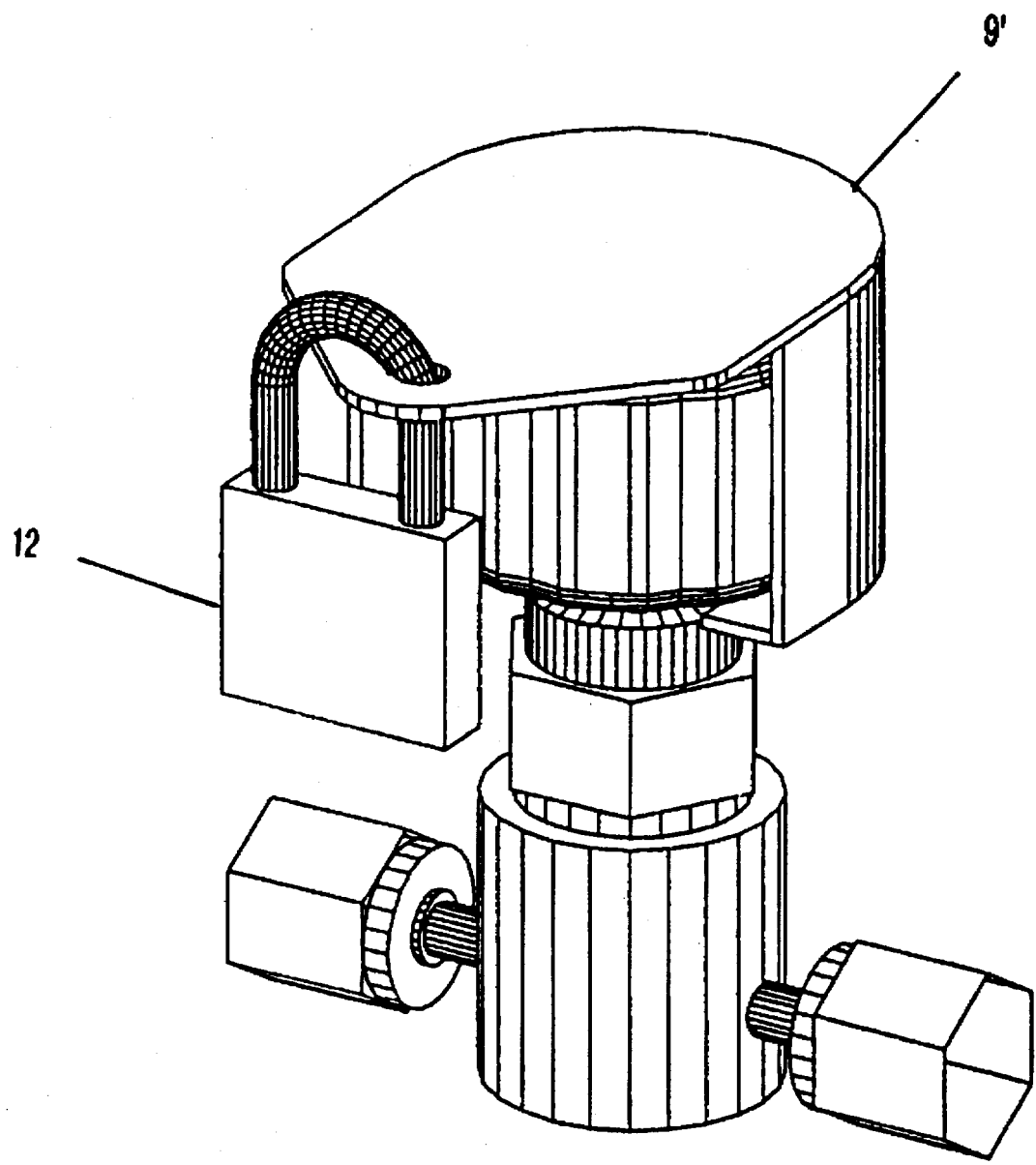
FIG. 3 is a perspective view of a cap and padlock embodiment of the invention.
Figure 4:
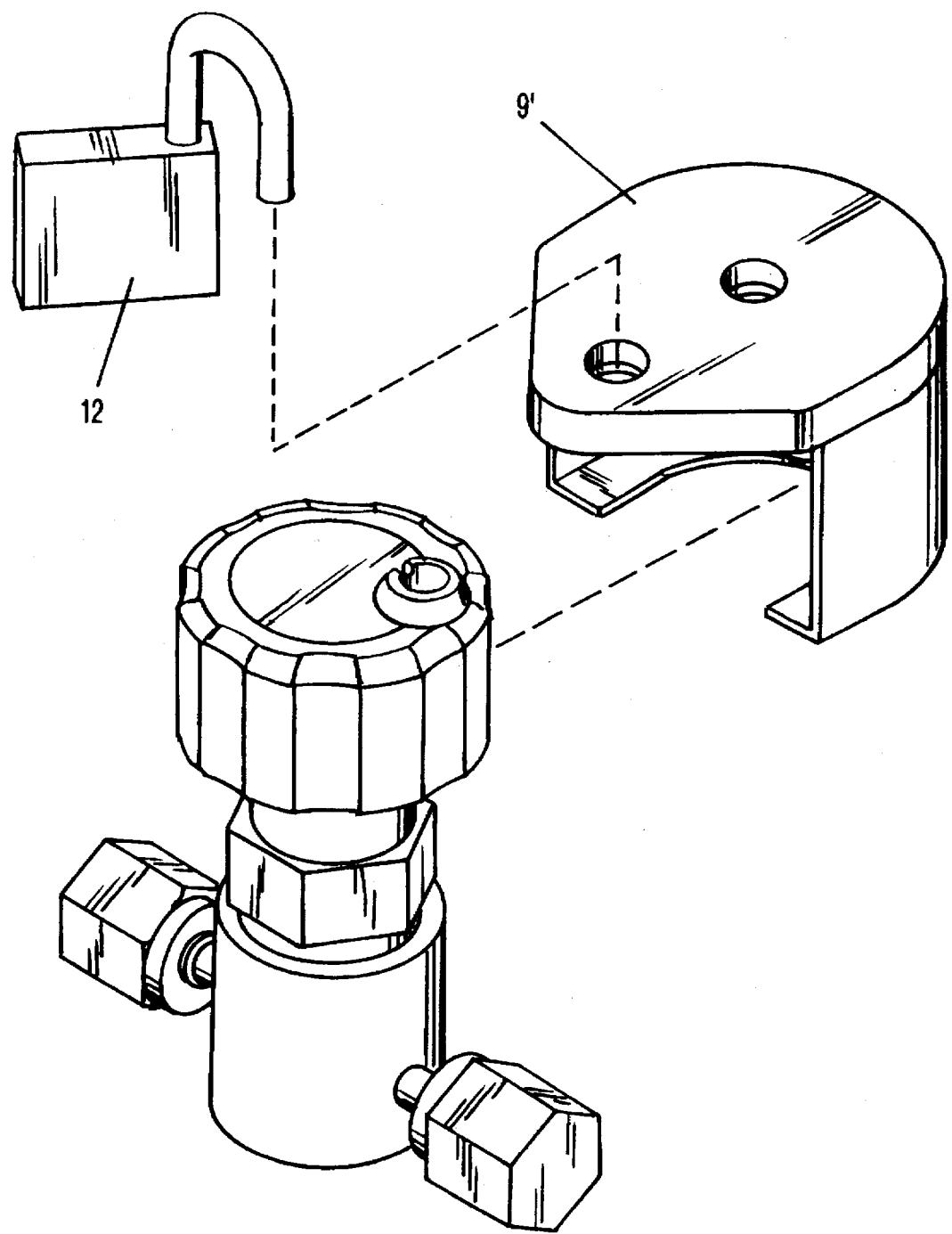
FIG. 4 is a perspective view of the embodiment of FIG. 3 with the cap and padlock disengaged.

Referring to FIGS. 3 and 4, an alternative embodiment of cap 9' and a padlock (or equivalent lock) 12 may be provided which complies with Occupational Safety and Health Administration (OSHA) lock-out or tag-out requirements. Cap 9' is secured in place by padlock 12. FIG. 4 shows the device of the invention with cap 9' and padlock 12 removed.

Figure 5:
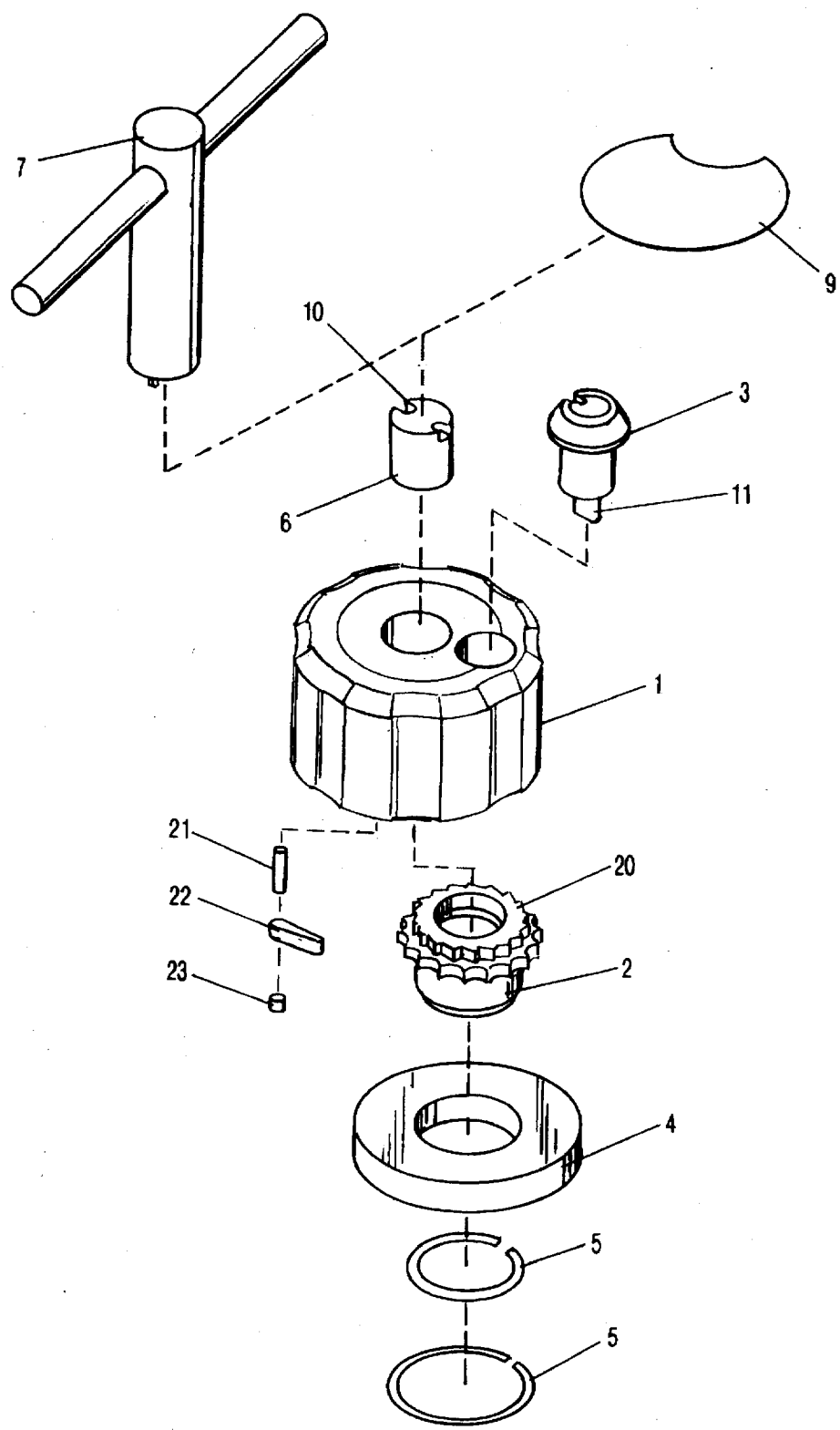
FIG. 5 is an exploded view of a second embodiment of the invention.
Figure 6:
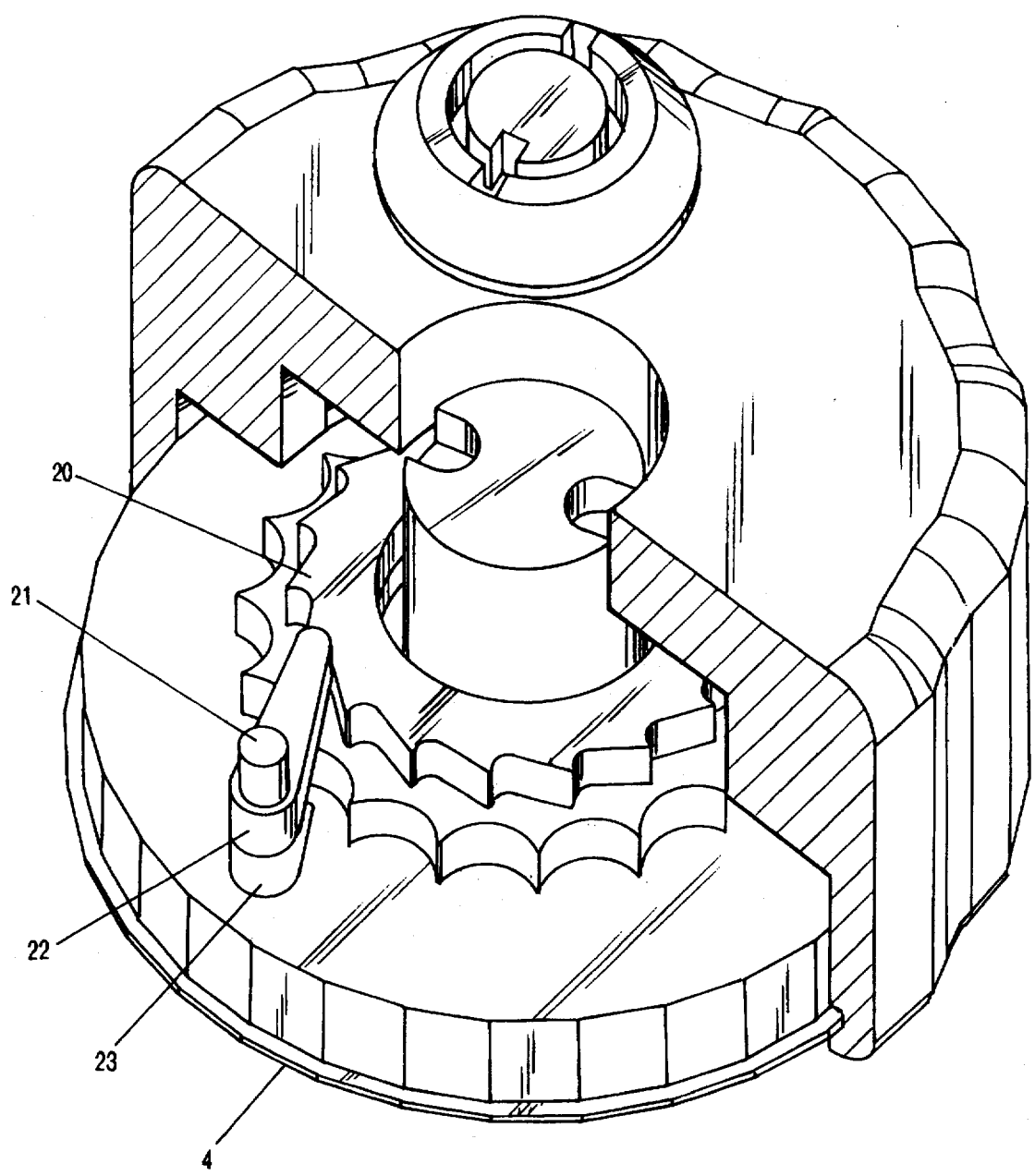
FIG. 6 is a cut-away perspective view of the embodiment of FIG. 5 when in place on a valve.

FIGS. 5 and 6 illustrate a second embodiment of the invention which, in the locked condition free-wheel rotates in one direction but permits operation of the valve in the other direction. Usually, this embodiment will be used to prevent opening a valve (e.g. turning counterclockwise which causes free-wheel rotation) of the handle relative to the stem) while permitting closing of a valve (e.g. turning clockwise to close) in emergencies, although the opposite operation may be useful in some cases. The one-way locking embodiment employs a ratchet mechanism 20 with pin 21 lever 22, and spring 23. As can be seen from FIG. 6, lever 22 will permit rotation clockwise but not counterclockwise.

In FIG. 1 the first embodiment of the valve lockout is shown in vertical cross section where, as may be seen in either of the figures, the handle body 1 includes an opening into which there is inserted a bearing 4 which is retained in the opening in the body 1 with a retainer ring 5 and within the opening of the bearing there is rotatively mounted the drive gear 2 having an opening through which the stem of the valve protrudes when the valve lockout is in position. As seen from FIG. 1, the drive gear 2 has a plurality of teeth for selective engagement of the lock mechanism 3 as will be explained. The lock mechanism 3 is a cylindrical assembly which is inserted into a cylindrical opening that is radially displaced from the opening into which the tamper-proof lock nut 6 is inserted. The lock mechanism is held in place with a retaining pin 8. The lock mechanism has an outer body 17 and an inner body 12 which is key actuated. The inner body 12 has a dog 11 that protrudes into the upper opening of the valve body 1. The tab is off-center of the axis of the inner body 12 so that when the key is used to rotate the inner body 12 into a first position, the dog 11 allows the body 1 to turn relative to the drive gear 2 which is in turn attached to the stem of the valve that is being operated and protected by the instant invention. When the key is used to rotate the inner body 12 into the second position, 180 degrees opposite from the first position, it will be seen that dog 16 protrudes between the teeth on the drive gear 2. Thus, presence of the key in the lock mechanism 3 is necessary to lock the housing 1 relative to the drive gear 2 and thus the stem of the valve so that rotation of the housing 1 will open or close the valve under manual operation. On the other hand, when the key has been rotated 180 degrees so as to rotate the inner body 12 relative to the outer body 17 to the first position withdrawal of the key prevents relative rotation between the inner body 12 and the outer body 17 so that the dog 11 is not engaging the drive gear 2 and thus the handle free wheels relative to the valve and valve stem. This of course prevents anyone without the key from rotating the valve stem so as to either open or close the valve.

The present invention is designed to directly replace an existing OEM handle and provide the user with lockout capability. To install the invention the user must first remove the existing OEM handle via the use of a socket wrench or screwdriver. Installation of the present invention is accomplished by using the installation tool 7 that is keyed to drive the tamper proof lock nut 6 on to the existing threaded drive stem of the component. By jamming the nut against the face of the drive gear component 2, the invention is then tied to the component's drive stem. At this point, the invention can allow component adjustment via engaging the keyed cylinder 3 to the drive gear 2. To finish the installation, an injection molded plastic cap is preferably pressed onto handle body 1. The present invention may also be used with splined drives by fitting the invention into corresponding splined fittings.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

What is claimed is:

1. A lockout device for a valve having a stem comprising:
   a generally cylindrical handle body having a cylindrical opening at its lower end of a first diameter for receiving the valve stem;
   a drive gear having a plurality of teeth, adapted to be mounted on the valve stem for rotation therewith;
   bearing means adapted to be mounted within said cylindrical opening and concentrically and rotatably supporting said drive gear;
   cylindrical locking means mounted within a cylindrical opening in the upper surface of said handle body and that is radially displaced from the axis of said body, including a key actuated center cylinder having a dog movable from a first position disengaged from the teeth of said drive gear to a second position engaging the teeth of said drive gear; and
   a ratchet wheel and a spring biased pawl mounted within said opening at the lower end of the handle body to prevent rotation of said valve stem when said dog is in said first position;
   whereby when said locking means dog is in said first position, the handle body is free to rotate relative to the drive gear and valve stem and in the second position is locked to said drive gear and valve stem so as to permit rotation of the handle body to effect like rotation of the drive gear, thereby opening and closing the valve.

2. The device of claim 1 additionally comprising a retaining ring to retain said bearing means within said handle body.

3. The device of claim 1 additionally comprising a retaining ring to retain said drive gear within said handle body.

4. The device of claim 1 additionally comprising lock nut means for securing said handle body to said valve stem.

5. The valve lockout device of claim 4 wherein said lock nut means comprises a spanner wrench hole pattern on a top thereof.

6. The valve lockout device of claim 5 additionally comprising an assembly tool having a spanner wrench hole pattern matching that of said lock nut means.

7. The valve lockout device of claim 1 additionally comprising personal ownership cap and padlock means covering said handle body.

8. The valve lockout device of claim 1 wherein said locking means when engaged prevents opening of a valve but permits closing of the valve.

9. The device of claim 1 wherein said locking means provides free-wheel rotation of said handle body in one direction.

10. The valve lockout device of claim 1 additionally comprising an upper cylindrical opening in said handle body through which the valve stem is capable of passing through the drive gear and means for securing the handle body to the drive gear and valve.

* * * * *